United States Patent
Taylor

(10) Patent No.: US 6,185,921 B1
(45) Date of Patent: Feb. 13, 2001

(54) METHOD AND TWO HEAD APPARATUS FOR HARVESTING TOBACCO

(75) Inventor: George Ronald Taylor, Elizabethtown, NC (US)

(73) Assignee: Taylor Manufacturing, Inc., Elizabethtown, NC (US)

(*) Notice: Under 35 U.S.C. 154(b), the term of this patent shall be extended for 0 days.

(21) Appl. No.: 09/247,509

(22) Filed: Feb. 10, 1999

(51) Int. Cl.[7] ................................................ A01D 45/16
(52) U.S. Cl. ............................................................. 56/27.5
(58) Field of Search ........................... 56/27.5, 330, 218, 56/219; 131/290, 313; 414/26

(56) References Cited

U.S. PATENT DOCUMENTS

| | | |
|---|---|---|
| 2,876,610 | 3/1959 | West et al. . |
| 3,083,517 | 4/1963 | Wilson . |
| 3,093,948 | 6/1963 | Root . |
| 3,507,103 | 4/1970 | Pickett et al. . |
| 3,654,753 | 4/1972 | Gervais . |
| 3,772,862 | 11/1973 | Wilson . |
| 3,962,850 | 6/1976 | Moore . |
| 4,035,998 | 7/1977 | Griner et al. . |
| 4,069,648 | 1/1978 | Taylor et al. . |
| 4,171,607 | 10/1979 | Taylor et al. . |
| 4,192,124 | 3/1980 | Balthes . |
| 4,332,128 | 6/1982 | Prince . |
| 4,476,669 | 10/1984 | Wilson . |
| 5,499,635 | 3/1996 | Haruzono . |

*Primary Examiner*—Robert E. Pezzuto
(74) *Attorney, Agent, or Firm*—Carter, Ledyard & Milburn

(57) ABSTRACT

The present invention relates to an improved tobacco harvester adaptable to various harvesting conditions without the necessity to manually remove and/or install defoliating blades or harvesting heads. The present invention has two harvesting heads including a stationary lower harvesting head with a pair of defoliating paddles to harvest the sand lugs. The second harvesting head is a "tipping head" with rotating steel blades or "cutter bars" which is selectively lowered into position over the defoliator to harvest the leaves from the middle and upper portion of the tobacco stalk. The elevation of the tipping head may be adjusted from the operator station while the harvester is in service.

17 Claims, 4 Drawing Sheets

METHOD AND TWO HEAD APPARATUS FOR HARVESTING TOBACCO

BACKGROUND OF THE INVENTION

The present invention relates to tobacco harvesting and, more specifically, to a tobacco harvester with a stationary head to defoliate the lower tobacco leaves and a remotely controlled, vertically positioned, head to harvest the middle and upper tobacco leaves.

It has long been desired to reduce the amount of manual labor, time and expense associated with the harvesting of tobacco leaves. Harvesting of tobacco leaves has progressed significantly through the years. In the past, workers typically walked through the tobacco fields hand picking ("cropping" or "priming") the ripe tobacco leaves. Tobacco leaves on the stalk ripen at different times. The leaves ripen progressively from the bottom to the top of the stalk thereby necessitating multiple passes through the field during the harvesting season in order to remove progressively higher swaths of leaves from each stalk as they ripen.

Mechanized platforms were introduced which carried the tobacco pickers through the field. Although the tobacco was still hand picked, the mechanized platform allowed the pickers to complete their several passes through the tobacco fields at a faster rate.

Mechanized platforms gave away to mechanized harvesters which mechanically cut or stripped leaves from the stalk. However, the replacement of human pickers by mechanized harvesters has made the selective harvesting of only the ripe tobacco leaves more difficult. Additionally, size and shape of tobacco leaves differs as a function of their position on the stalk, making it difficult to use a single cutting mechanism.

Mechanized harvesters with replaceable cutting or defoliating units permitted the harvester to be set up to harvest a specific type leaf from the tobacco stalk. For example, the lowest leaves on the tobacco plant, known as "sand lugs", are more efficiently picked with a narrower or shorter size defoliating paddle or blade than are the larger leaves at the top of the tobacco plant. The defoliating blades or paddles of the typical harvester used to strip or cut the sandlugs from the tobacco stalk are firm and slender. Harvesting of the middle leaves required the manual replacement of the sandlug defoliating paddles with paddles suitable for the harvesting of the broader shape of the middle leaves. It was also common to manually replace the defoliating paddles with steel blades to more efficiently remove the middle and upper leaves from the tobacco stalk.

Additionally, the height of the harvesting head which held the defoliating paddles or steel blades had to be raised progressively higher throughout the tobacco harvesting season as the tobacco leaves were harvested higher and higher on the stalk.

The manual installation of the appropriate defoliating paddles or steel blades, combined with the necessary vertical adjustment of the harvesting heads, typically required several hours of preparation prior to harvesting. Once harvesting begun, any subsequent vertical adjustment of the harvesting head required stopping the harvester.

The introduction of mechanized tobacco harvesters also required a change in the way tobacco was planted. The physical size of the mechanized harvester grew as mechanized harvesters were developed which could harvest more than one row of tobacco in a single pass through the field. As a result, the typical tobacco field is planted with every fifth row missing to allow for the passage of the mechanized harvesters through the fields.

The present invention obviates the need to manually replace the defoliating paddles or blades. Additionally, the configuration of the present invention allows the harvester to straddle two adjacent rows of tobacco plants, thereby eliminating the necessity of not planting the fifth row of tobacco plants. Importantly, the height of the harvesting head can be adjusted remotely from the operator station while the harvester is in motion, thereby quickly adapting the tobacco harvester to harvest any selected portion of the tobacco stalk.

Accordingly, it is an object of the present invention to provide a novel tobacco harvester and method which is capable of removing all the leaves of from the tobacco stalk without the necessity of manually replacing the defoliating paddles or blades.

It is another object of the present invention to provide a novel tobacco harvester and method in which the height of the harvesting head may be remotely adjusted while the harvester in operating.

It is still another object of the present invention to provide a novel system and method for harvesting tobacco which requires reduced set-up time and effort.

It is still another object of the present invention to provide a novel tobacco harvester and method permitting the planting of every row in the field thereby maximizing the amount of tobacco planted.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
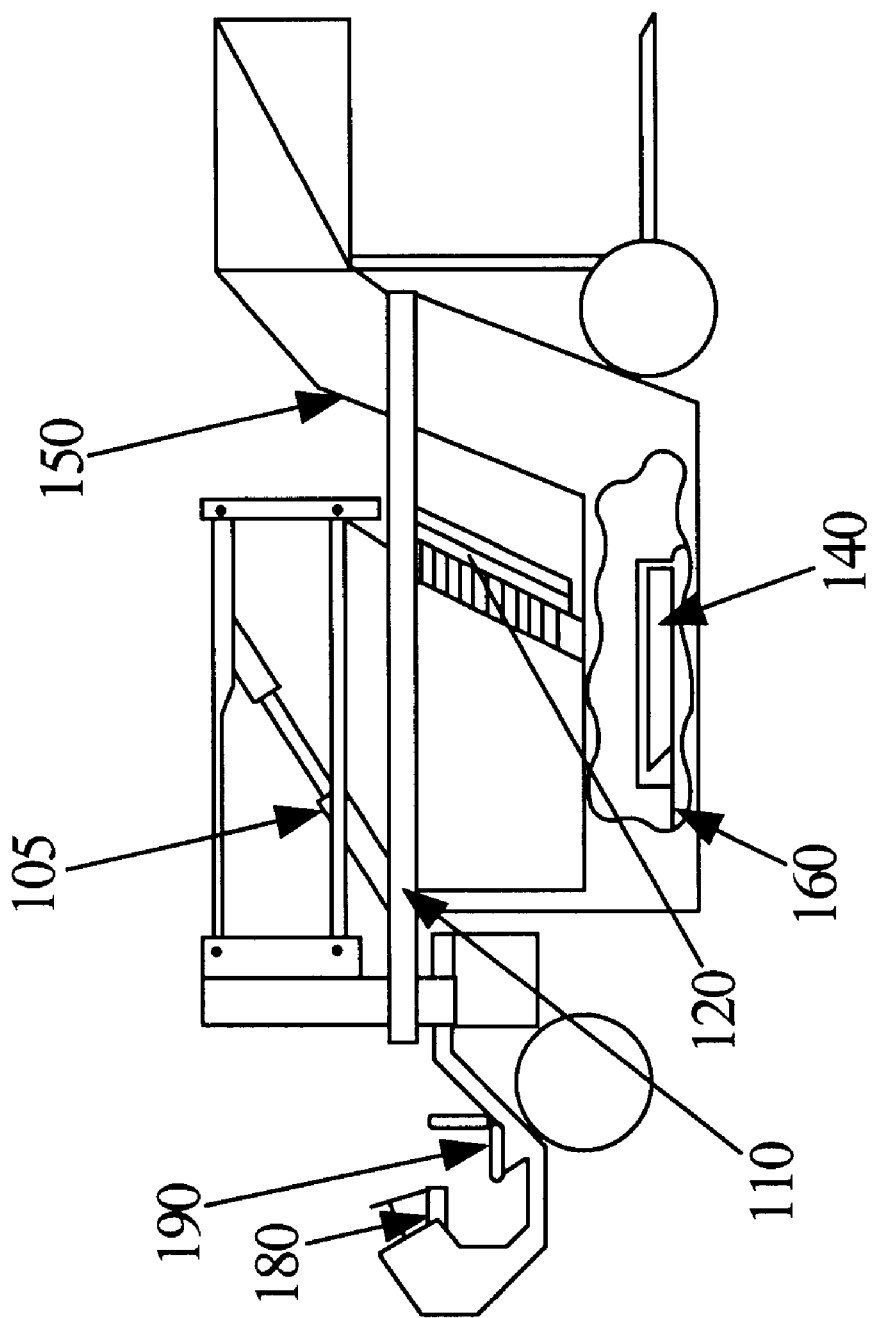
FIG. 1 is a side elevation of one embodiment of the tobacco harvester of the present invention without the leaf removal system.

With reference to FIG. 1, a self-propelled tobacco harvester 100 is illustrated. While a preferred embodiment of the present invention harvests two rows of tobacco simultaneously, the description is confined to the components necessary to harvest one row of tobacco with the understanding that the components may be replicated for the simultaneous harvesting of additional rows. The harvester frame 110 supports the harvesting heads, which may comprise a lower stationary head (the defoliator) 140 and an upper vertically adjustable tipping head 120, the conveyor 160, the elevator 150, and the hydraulic cylinder and piston 105. The harvester 100 may be powered by conventional means such as a diesel or gasoline engine, not shown.

The tobacco harvester 100 is operated from the operator's station 190, which in this embodiment is also supported by the harvester frame 110. The operator of the tobacco harvester may control the hydraulic cylinder and piston 105 by the remote switch 180 and conventional electro-hydraulic means well known in the tobacco harvesting art. It should be understood that any conventional means for providing the motive force to raise and lower the harvesting head may be used in lieu of the hydraulic system illustrated.

Figure 2:
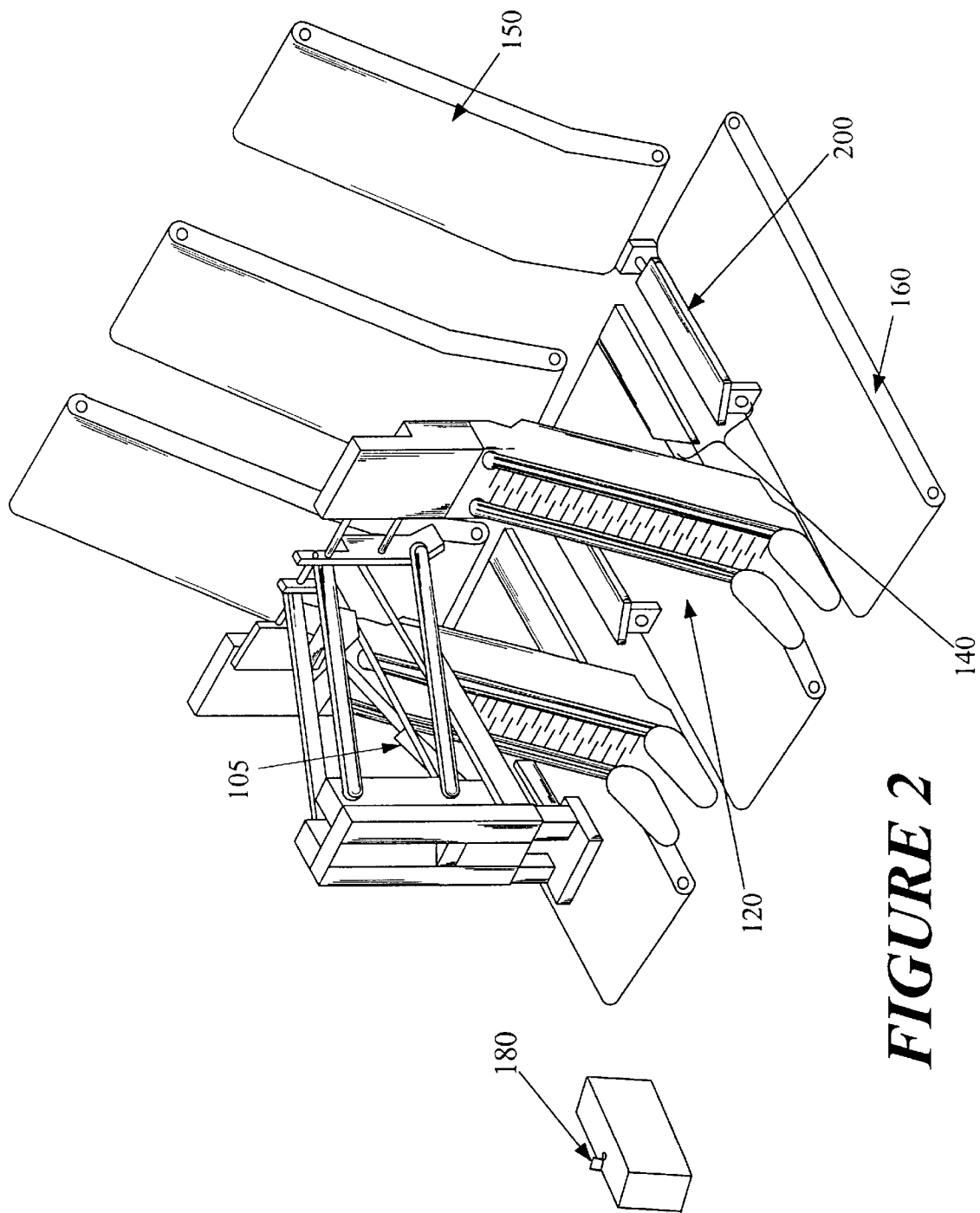
FIG. 2 is a perspective view from a front quadrant of the leaf removal system of the tobacco harvester of FIG. 1.

With reference to now to FIG. 2, the tipping head 120 may be lowered into position over defoliator 140 by operation of the remote switch 180.

In operation, the operator may raise and lower the tipping head 120 by the remote switch 180, thus allowing the operator to quickly raise the tipping head 120 to an out-of-service position (not shown). With the tipping head 120 raised to an out of service position, the stationary defoliator 140 removes only the lower leaves from the stalk as the tobacco harvester passes through the rows of tobacco stalks and the middle and upper tobacco leaves pass undisturbed beneath the tipping head 120 for harvesting at a later time.

When the operator desires to harvest the middle and upper leaves of the tobacco plant, he can quickly lower the tipping head 120 into service at the desired vertical level using the remote switch 180. The tipping head 120 removes a swath of leaves from tobacco stalk at the desired elevation as the tobacco harvester passes through the rows of tobacco stalks.

Remote switch 180 allows the operator to adjust the vertical position of the tipping head 120 while the tobacco harvester is moving and to make any necessary vertical adjustments during the harvesting of the tobacco leaves.

As tobacco leaves are removed from the stalk either by defoliator 140 or tipping head 120, the leaves are directed by the defoliator shield 200, a fan (not shown) and gravity to conveyor 160 which is positioned beneath defoliator 140 and the tipping head 120. The conveyor 160 may carry the tobacco leaves aftward to elevator 150. The elevator 150 may be a vertically directed conveyor belt which may carries the leaves to a suitable collection container (not shown) which may be carried by tobacco harvester and supported by tobacco frame 110 by any conventional means. The use of vertically displaced and horizontally displaced conveyor means to transport the harvested leaves to suitable collection means is well known within the prior art and will not be described further in the present description.

Figure 3:
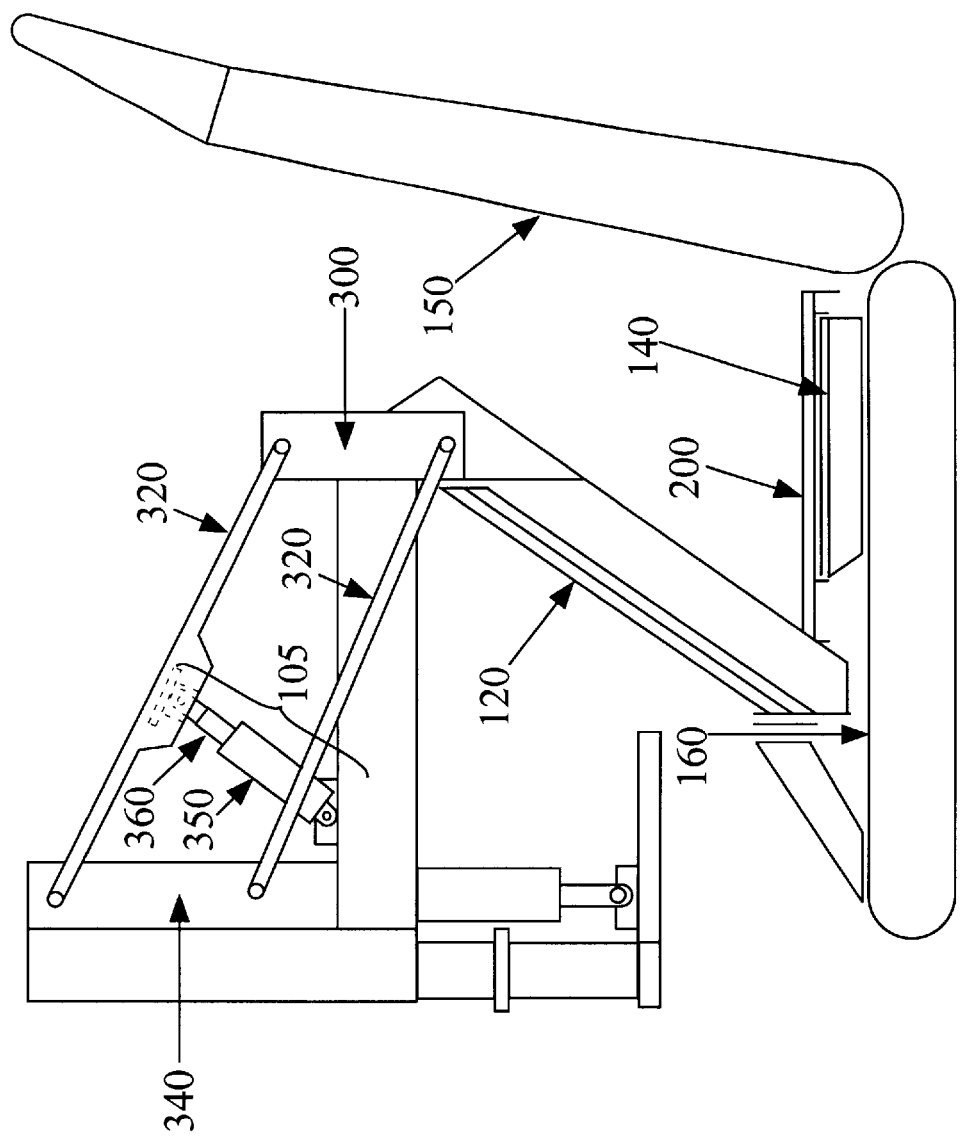
FIG. 3 is a side view of the leaf removal system of FIG. 2 (showing the defoliator, tipping head (down position), hydraulic cylinder, conveyor, and elevator).

With reference to FIG. 3, the upper end of the tipping head assembly 300 is pivotally connected to upper and lower support arms 320. The opposite ends of support arms 320 are pivotally connected to support frame 340. Hydraulic cylinder and piston 105 is attached to the support frame 340 at the cylinder end 350 and attached to the upper support arm 320 at the piston end 360.

In operation, remote switch 180 may cause hydraulic fluid to be directed to the cylinder 350 thereby forcing piston 360 out of cylinder 350. Piston 360 raises upper support arm 320 in a vertical direction causing both support arms 320 to pivot about the connections to the support frame 340 thereby raising tipping head assembly 300 in a vertical direction.

In a similar fashion, operation of remote switch 180 may cause hydraulic fluid to be directed to cylinder 350 causing piston 360 to retract into cylinder 350. Piston 360 lowers upper support arm 320 causing both support arms 320 to pivot about the connections to support frame 340, thereby lowering tipping head assembly 300.

Figure 4:
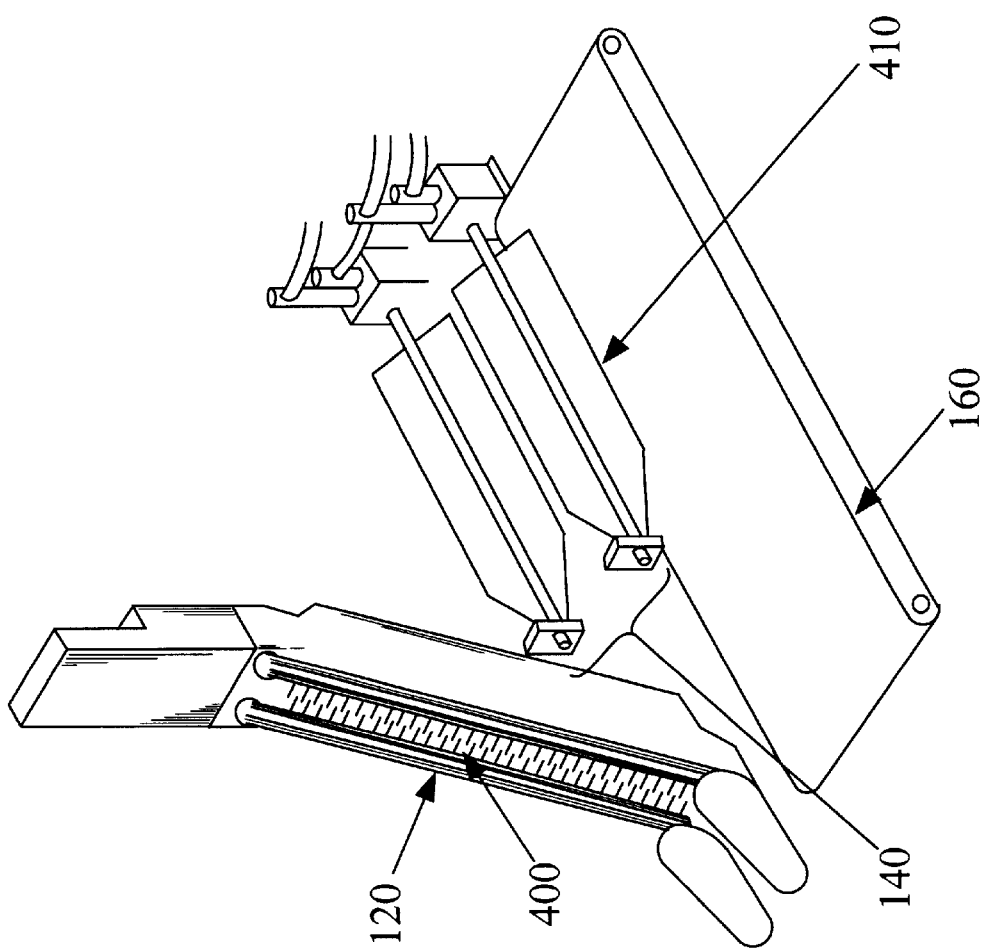
FIG. 4 is a perspective view of a tipping head, defoliator, and conveyor of FIG. 3.

With reference to FIG. 4, a tipping head 120 and defoliator 140 are depicted. The tipping head 120 may contain cutter bars 400, which may be rotating blades made of steel or other suitable material, used to remove the middle and upper tobacco leaves from the stalk. The defoliator 140 may comprise a pair of defoliator paddles 410 made of rubber or other suitable material in conventional shapes and sizes.

In operation, each defoliator paddle 410, when rotated, removes the lower leaves from the tobacco stalk. The removed leaves may be directed by conventional defoliator shields (not shown), a fan (not shown) and by gravity to the conveyor 160. While the defoliator paddles 410 in one embodiment of the present invention are rotated by a hydraulic motor, it is understood that those skilled in the art will appreciate that the motive force may be provided by any conventional means.

With continued reference to FIG. 4, the cutter bars 400 are rotated to strip the leaves from the middle and upper region of the tobacco stalk. The removed leaves may be directed to the conveyor 160 by a fan (not shown) and gravity. Conveyor 160 may transport the leaves to any suitable container for collection.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. An apparatus to remove tobacco leaves from a tobacco stalk comprising
    a frame having an operator station and being adapted to be moved in rolling contact with the ground along a row of tobacco stalks;
    a first stationary defoliator supported by said frame to harvest the lower tobacco leaves;
    a first remotely adjustable tipping head supported by said frame above said first stationary defoliator;
    first means for selectively positioning said first tipping head to selectively harvest tobacco leaves at elevations above said first stationary defoliator.

2. The apparatus of claim 1, wherein said tipping head positioning means has the capability of raising said tipping head to an out-of-service position above the height of the tobacco stalks being harvested.

3. The apparatus of claim 1, wherein said selectively positioning means includes remote control means operable from the operator station on said frame.

4. The apparatus of claim 1, wherein said frame is self propelled.

5. The apparatus of claim 1, including a collection container carried by said frame; and
    wherein said frame includes means for conveying harvested tobacco leaves from said defoliator and said tipping head to said collection container.

6. The apparatus of claim 1, wherein said selectively positioning means is hydraulically operated.

7. The apparatus of claim 1, wherein said stationary defoliator comprises non-cutting means for breaking the lower leaves from a stalk.

8. The apparatus of claim 1 including:
    a second stationary defoliator supported by said frame laterally spaced from said defoliator for harvesting lower tobacco leaves from a second row of tobacco stalks;
    a second remotely adjustable tipping head supported by said frame above said second stationary defoliator;
    second means for selectively positioning said second tipping head to selectively harvest tobacco leaves from the second row of tobacco stalks at elevations above said second stationary defoliator.

9. The apparatus of claim 8 wherein said first and second selectively positioning means is selectively operable during operation of said first and second tipping heads.

10. The apparatus of claim 8 wherein said first and second selectively positioning means is selectively operable during motion of said frame.

11. In a tobacco harvester having an operator station, a collection container, at least two harvesting heads and means for conveying harvested leaves from the heads to the container, the improvement wherein one of said heads is fixed in elevation and the other of said heads is selectively adjustable in elevation above said first head while the tobacco harvester is in motion harvesting tobacco.

12. The tobacco harvester of claim 11 wherein said stationary head includes a single pair of paddles and said adjustable head includes a cutting bar.

13. A method of harvesting leaves from a row of tobacco stalks comprising the steps of
   a) passing a tobacco harvester having at least one vertically adjustable tipping head through the row of tobacco stalks; and
   b) adjusting the elevation of the tipping head without stopping the movement of said harvester through the tobacco stalks.

14. A method of removing the leaves from a tobacco stalk comprising the steps of:
   (a) providing a tobacco harvester having a stationary head and at least one vertically adjustable tipping head;
   (b) selecting either the stationary head or the tipping head as a function of the desired elevation from which to remove tobacco leaves the tobacco stalk;
   (c) passing the tobacco harvester along a row of tobacco stalks while operating the selected head to thereby remove leaves from the stalk at the desired elevation.

15. The method of claim 14 including the step of elevating the tipping head above the height of the tobacco stalks when the stationary head is selected as the operating head.

16. The method of claim 14 including the step of selectively adjusting the elevation of the tipping head while the harvester is passing along the tobacco stalks when the tipping head is selected as the operating head.

17. The method of claim 14 further comprising the step of conveying harvested tobacco leaves to a collection container carried by the harvester as the harvester is moved along the row of tobacco stalks.

* * * * *